(12) United States Patent
Albright et al.

(10) Patent No.: US 7,304,021 B2
(45) Date of Patent: Dec. 4, 2007

(54) COLOR CHANGING PAINT AND VARNISH REMOVER

(75) Inventors: Robert L. Albright, Southampton, PA (US); Noel Newman, Jackson, NJ (US); Daniel Cohen, Manalapan, NJ (US)

(73) Assignee: Dynacraft Industries, Inc, Englishtown, NJ (US)

( * ) Notice: Subject to any disclaimer, the term of this patent is extended or adjusted under 35 U.S.C. 154(b) by 122 days.

(21) Appl. No.: 11/280,594

(22) Filed: Nov. 17, 2005

(65) Prior Publication Data

US 2007/0111913 A1    May 17, 2007

(51) Int. Cl.
    *C11D 7/26* (2006.01)
(52) U.S. Cl. ............... 510/100; 510/201; 510/202; 510/203; 510/211; 252/408.1
(58) Field of Classification Search ............... None
    See application file for complete search history.

(56) References Cited

U.S. PATENT DOCUMENTS

| | | | |
|---|---|---|---|
| 3,042,622 A * | 7/1962 | Kirshenbauer ............... 510/100 |
| 3,988,924 A * | 11/1976 | Alburger ............... 73/104 |
| 4,037,466 A * | 7/1977 | Alburger ............... 73/104 |
| 4,070,510 A * | 1/1978 | Kahn ............... 427/385.5 |
| 4,071,645 A * | 1/1978 | Kahn ............... 427/340 |
| 4,085,059 A * | 4/1978 | Smith et al. ............... 134/26 |
| 4,231,805 A | 11/1980 | Petterson et al. |
| 4,502,891 A | 3/1985 | Brocklehurst et al. |
| 4,518,518 A * | 5/1985 | Koch ............... 510/202 |
| 4,572,792 A | 2/1986 | Muller |
| 4,579,627 A * | 4/1986 | Brailsford ............... 134/38 |
| 4,645,617 A | 2/1987 | Vivian |
| 4,732,695 A | 3/1988 | Francisco |
| 4,749,510 A * | 6/1988 | Nelson ............... 510/212 |
| 4,812,255 A * | 3/1989 | Suwala ............... 134/38 |
| 5,006,279 A * | 4/1991 | Grobbel et al. ............... 510/206 |
| 5,011,621 A | 4/1991 | Sullivan |
| 5,073,289 A | 12/1991 | Collier et al. |
| 5,215,675 A * | 6/1993 | Wilkins et al. ............... 510/206 |
| 5,310,496 A | 5/1994 | Taylor |
| 5,413,729 A * | 5/1995 | Gaul ............... 510/206 |
| 5,425,895 A | 6/1995 | Stevens |
| 5,427,710 A | 6/1995 | Stevens |
| 5,518,661 A | 5/1996 | Langford et al. |
| 5,565,136 A | 10/1996 | Walsh |
| 5,569,410 A | 10/1996 | Distaso |
| 5,597,788 A | 1/1997 | Stevens |
| 5,605,579 A | 2/1997 | Distaso |
| 5,744,438 A | 4/1998 | Distaso |
| 5,990,062 A | 11/1999 | Summerfield et al. |
| 6,040,284 A | 3/2000 | Marquis et al. |
| 6,096,699 A | 8/2000 | Bergemann et al. |
| 6,159,915 A | 12/2000 | Machac, Jr. et al. |
| 6,162,776 A | 12/2000 | Marquis et al. |
| 6,169,061 B1 | 1/2001 | Machac, Jr. et al. |
| 6,239,090 B1 | 5/2001 | Marquis et al. |
| 6,369,009 B1 | 4/2002 | Machac, Jr. et al. |
| 6,428,628 B1 | 8/2002 | Umemoto |
| 6,482,270 B1 | 11/2002 | Machac, Jr. et al. |
| 6,548,464 B1 | 4/2003 | Machac, Jr. et al. |
| 6,586,380 B2 | 7/2003 | Marquis et al. |
| 6,624,222 B2 | 9/2003 | Kestyn et al. |
| 6,790,891 B2 | 9/2004 | Kestyn et al. |

* cited by examiner

*Primary Examiner*—Gregory Webb
(74) *Attorney, Agent, or Firm*—Dan M. DeLaRosa

(57) ABSTRACT

A color change paint and varnish removal formulation is provided. The formulation comprises: at least one penetrant, at least one carrier and at least one colorant whereby the formulation is applied to the target area and as the surface of the formulation dries, the carrier partially dehydrates emitting white light as the colorant migrates away from the dehydrating surface and there is a color change to indicate that the stripping action of the formulation has ceased and is ready for the scraping and removal step.

21 Claims, No Drawings

COLOR CHANGING PAINT AND VARNISH REMOVER

BACKGROUND OF THE INVENTION

1. Field of the Invention

This invention generally relates to a color change paint and varnish remover. More specifically, the present invention provides for a paint removal formulation having a color change feature to indicate when the stripping action of the formulation has substantially ceased and is ready for removal. The formulation comprises: at least one penetrant, at least one carrier and at least one colorant whereby the formulation is applied to the target area and as the surface of the formulation dries, the colorant migrates away from the dehydrating surface leaving a finely divided carrier that emits white light. This color change indicates that the stripping action of the formulation has ceased and is ready for the scraping and removal step.

2. Description of the Related Art

The term "paint and varnish remover" as used herein refers to chemical compositions which can strip or remove all types of coatings, such as, paints, lacquers, enamels, varnishes, shellac, polyurethane, epoxies, and other coatings used on substrates such as metal and wood.

Methylene chloride paint strippers have long been the standard for stripper performance. Although effective in stripping action, high volatility shortens the working time for paint and varnish removal, often requiring more than one application when used on thicker accumulations of paint. In addition, the environmental concerns and the potential carcinogenic effects based on lab tests on mice and rats, has led to ever increasing regulations concerning its use.

Other solvents, such as toluene, xylene, methanol, acetone, ethanol in addition to being flammable, are themselves or in various combinations also highly volatile, requiring multiple applications when thick accumulations of paint are to be removed, and therefore suffer because their work life is insufficient to permit complete penetration of the paint layers before drying out.

The use of safer solvents to replace methylene chloride and flammable paint and varnish removers, is well documented in previous patents. N-methyl-2-pyrrolidone (NMP) has long been employed as the main active ingredient in various paint stripper compositions that offer safer alternatives to methylene chloride and flammable solvent compositions. (NMP) costs over four times as much as methylene chloride, and as much as ten times as much as common flammable alternatives, and various attempts have been made by adding less costly components to (NMP) mixtures, while still maintaining removal properties. U.S. Pat. Nos. 4,120,180; 4,749,510; 5,006,279; and 5,015,410 all refer to various combinations of (NMP) and various aromatic hydrocarbons and other additives to maintain removal efficiency and lower overall costs. Unfortunately, such aromatic hydrocarbons are under increasing regulatory pressures as hazardous air pollutants, and their insolubility in water makes them more difficult to remove from the surface by water washing. Furthermore, these aromatic (NMP) blends, using recommended thickeners, primarily of the cellulosic type, suffer from poor sag resistance, especially when sheared by rapid brushing action or spraying. This leads to insufficient thickness of paint and varnish remover to penetrate effectively, before drying out. U.S. Pat. Nos. 4,666,626 and 4,732,695 refer to paint and varnish removers based on oxy hexyl acetate/cyclohexanone compositions, and benzyl alcohol, aromatic hydrocarbon/(NMP) compositions, respectively, which rely on cellulosic thickeners that sag or drip pulling the paint and varnish remover away from the paint surface so that direct contact is lost. The loss of contact destroys penetrability before drying out.

U.S. Pat. Nos. 5,098,591; 5,124,062; 5,167,853; and 5,298,184 refer to paint and varnish removers based on combinations of (NMP) and various citrus terpene solvents. These compositions also contain cellulosic type thickeners, as well as organoclay thickening agents to aid in sag resistance and to control flow. U.S. Pat. No. 5,035,829 utilizes primarily (NMP), acids and alkylene glycol ethers, and relies on cellulosic thickeners, and is used to remove over spray from spray booths. U.S. Pat. Nos. 5,049,300; 5,098,592, and 5,154,848, disclose compositions containing (NMP) and or (BLO) gamma-butyrolactone, and ethyl 3-ethoxyproprionate (EEP) using cellulosic type thickeners to provide thickening and sag resistance.

Thus, there remains a need in the art to provide an effective paint and varnish stripper which has better sag resistance, especially on vertical surfaces, while maintaining stripping effectiveness, along with the lower toxicities, volatilities, and environmental benefits that are outlined in various patents, while avoiding the use of methylene chloride, toluene, methyl ethyl ketone, acetone, methanol or other highly volatile and/or flammable components.

Most traditional strippers containing methylene chloride or other volatile and flammable chemicals such as methanol methyl ethyl ketones, acetone or toluene, and strip paint quickly, but will remove only 1 or 2 layers per application.

In the color change formulations, the natural color of the components fades to off-white when the stripping action has substantially ceased. The addition of a coloring agent, such as a dye or a pigment, to the compositions in the range of up to 2%, will intensify the color change (i.e. a medium green to off-white or a pale green) to signal better to the applicator that removal should begin. In addition, with the advent of modern day safer stripper formulations, the resulting stripping actions tend to be much slower than paint and varnish removers based on methylene chloride, and other volatile, flammable solvents or combinations thereof, so that it is difficult to determine when the striping action is finished.

Furthermore, it is well known in the art, that modern day paints, based on latexes, because of their tendency to buckle, swell and blister cause difficulties in maintaining contact with the layers of paint to be stripped. The stripping agent is pulled away from the surface by the buckled and blistered paint. Often this results in the paint stripper and loosened top layers of paint to drop from the sub-layer of paint producing a loss of direct contact with the paint stripper. The loss of direct contact requires additional application of paint stripper. Thus, there remains a need in the art to provide an effective paint and varnish remover which has better sag resistance, very low odor, a signaling device to indicate the completion of paint stripper action, and an effective way to prevent the excessive bubbling, blistering and swelling that can lead to the types of problems described herein.

Furthermore, despite the present of surfactants and other wetting agents, soaps and the like, it has been proven through experimentation that many of the compositions and formulas fail to loosen the paint layers sufficiently if dried to the point where little or no liquid is present. Therefore, there remains a need in the art for a paint and varnish remover that is removable at any stage wet or dry, even when the remover has totally dried.

It is advantageous if these improvements in the state of the art also has lower volatilities and, environmental benefits that are outlined in various other patents referenced, while avoiding the use of methylene chloride, toluene, methyl ethyl ketone, acetone, methanol, ethanol or other highly volatile and/or flammable components.

The color change feature of the present invention signals the completion of the paint strippers action and indicates the time at which the paint stripper is ready to be removed along with the softened paint layers. The paint and varnish stripper of the present invention is biodegradable, non-flammable, odor free and easily cleaned up with water. It contains no methylene chloride or caustic. It truly clings to vertical surfaces. It removes most varieties of paints and varnishes, which are oil or water-based including latexes, stains, alkyds, and polyurethane. It can be applied on a multitude of interior and exterior surfaces including wood, brick, plaster, metal, marble, masonry, concrete and fiberglass. It also strips significantly more paint than traditional paint strippers.

SUMMARY OF THE INVENTION

In one embodiment, the present invention relates to a paint removal formulation having a color change feature to indicate when the stripping action of the formulation has ceased and is ready for removal; the formulation comprises: at least one penetrant, at least one carrier and at least one colorant whereby the formulation is applied to the target area and there is a color change to indicate that the stripping action of the formulation has ceased and is ready for the removal step.

In another embodiment, the penetrant is selected from a group consisting of NMP, benzyl alcohol, ethyl lactate, dimethyl adipate, dimethyl glutarate, diethyl adipate, diethyl glutarate, ethyl benzoate, dimethyl succinate, diethyl succinate, dimethyl phthalate, diethyl phthalate, dimethyl terphthalate, diethyl terphthalate, ethylene bis(lactate), dimethyl sulfoxide, soy solvents, D-limonene and mixtures thereof.

In still another embodiment, the carrier is selected from a group consisting of polysaccharides, starch, cellulose, polydextran, chitosan, chitin, limestone, metal oxides, aluminum silicates, hydrated aluminates, sodium magnesium silicates, barium sulphates, ferroxides, magnesium aluminum silicates and mixtures thereof. In yet another embodiment, the colorant is selected from a group consisting of dye, pigments and mixtures thereof. In a further embodiment, the penetrant is selected from a group consisting of methylene chloride, toluene, methyl ethyl ketone, acetone, methanol, xylenes, mineral spirits, hi-flash naphtha and mixtures thereof. In still yet another embodiment, the formulation further comprises water.

In still yet another embodiment, the colorant migrates away from a surface of the formulation as the surface of the formulation dries. In another embodiment, the carrier partially dehydrates and emits white light as the surface of the formulation dries.

In a further embodiment, the formulation comprises from about 5 to about 55% by weight of the penetrant, from about 2 to about 50% by weight of the carrier, from about 0.01 to about 0.10% by weight of the colorant and from about 15 to about 50% by weight of the water.

In another embodiment, the formulation further comprises at least one thickening agents, said thickening agents being selected from a group consisting of Fullers earth, clay, attapulgite, montmorillonite, magnasol, klucel H, hydroxyethyl cellulose, hydroxypropyl cellulose, methocel and mixtures thereof. In still another embodiment, the formulation further comprises at least one wetting agent, said wetting agent being selected from a group consisting of propylene glycol, butylene glycol, ethylene glycol, diethylene glycol, triethylene glycol, tetraethylene glycol, pentamethylene glycol, neopentyl glycol, diethylene glycol monomethyl ether, monomethyl ethers of triethylene glycol, tetraethylene glycol, pentaerythritol, dipentaerythritol, neopentyl glycol and mixtures thereof.

In yet another embodiment, the formulation further comprises at least one activator, the activator being selected from a group consisting of formic acid, acetic acid, glycolic acid, hydroxyacetic acid, chloroacetic acid, fluoroacetic acid, oxalic acid, lactic acid and mixtures thereof.

In still yet another embodiment, the present invention provides for a colored paint removal product that becomes a paler color of the product after it has been applied to the target area, has softened the paint and is ready for removal. In a further embodiment, the product comprises: at least one penetrant, at least one carrier, and at least one colorant whereby the product, when applied to the target area, changes color as the surface of product dries, the carrier partially dehydrates emitting white light and the colorant migrates away from the dehydrating surface. In one embodiment, the colored product becomes white to indicate that the stripping action of the product has ceased and is ready for scraping or removal step. More particularly, the product changes color by a whitening process whereby the colorant migrates away from the dehydrating surface leaving the finely divided carrier to emit white light. In another embodiment, the colored product becomes paler than its original color to indicate that the stripping action of the product has ceased and is ready for the removal step.

In another embodiment, the method of manufacturing a paint removal composition that changes color to indicate that the stripping action of the composition has substantially ceased and is ready for the scraping or removal step, comprises admixing at least one penetrant, at least one carrier, and at least one colorant whereby the composition is applied to the target area and as the surface of the composition dries, the carrier partially dehydrates emitting white light as the colorant migrates away from the dehydrating surface. Hence, there is a color change to indicate that the stripping action of the product has substantially ceased and paint or varnish is ready for removal. For purposes of this invention and this embodiment, the term substantially can mean from about 50 to about 95% of the stripping action of the composition has occurred and the user may begin scraping and removing the paint layers from the medium. For purposes of this invention, the terms "scraping" and "removal" may mean the same thing. In another embodiment, the term "scraping" may mean the back and forth motion by the user utilizing a stripping or scraping tool. In a further embodiment, the term "removal" may mean the overall process of removing the paint with the paint removal composition.

In still another embodiment, the method further comprises admixing water. In yet another embodiment, the formulation comprises from about 5 to about 50% by weight of the penetrant, from about 2 to about 50% by weight of the carrier, from about 0.01 to about 0.1% by weight of the colorant and from about 15 to about 50% by weight of the water.

In still yet another embodiment, the method further comprises admixing at least one thickening agents, the thickening agents being selected from a group consisting of Fullers earth, clay, attapulgite, montmorillonite, magnasol, klucel H, hydroxyethyl cellulose, hydroxypropyl cellulose, methocel and mixtures thereof.

In another embodiment, the method further comprises admixing at least one wetting agent, the wetting agent being selected from a group consisting of propylene glycol, butylene glycol, ethylene glycol, neopentyl glycol, diethylene glycol, triethylene glycol, tetraethylene glycol, pentamethylene glycol, diethylene glycol monomethyl ether, monomethyl ethers of triethylene glycol, tetraethylene glycol, pentaerythritol, dipentaerythritol, neopentyl glycol and mixtures thereof.

In yet another embodiment, the method further comprises admixing at least one activator, the activator being selected from a group consisting of formic acid, acetic acid, glycolic acid, hydroxyacetic acid, chloroacetic acid, fluoroacetic acid, oxalic acid, lactic acid and mixtures thereof.

In still another embodiment, the method of manufacturing a paint removal composition that changes color to indicate that a stripping action of the composition has substantially ceased and is ready for a scraping step, the method comprises admixing at least one penetrant, at least one carrier, and at least one colorant whereby the composition is applied to the target area and there is a color change to indicate that the stripping action of the composition has substantially ceased and is ready for scraping and removal, the penetrant is selected from a group consisting of NMP, benzyl alcohol, ethyl lactate, diethyl adipate, diethyl glutarate, ethyl benzoate, dimethyl succinate, diethyl succinate, dimethyl phthalate, diethyl phthalate, dimethyl terphthalate, diethyl terphthalate, ethylene bis(lactate), dimethyl sulfoxide, soy solvents, D-limonene and mixtures thereof, and the carrier is selected from a group consisting of polysaccharides, starch, cellulose, polydextran, chitosan, chitin, limestone, metal oxides, aluminum silicates, hydrated aluminates, sodium magnesium silicates, barium sulphates, ferroxides, magnesium aluminum silicates and mixtures thereof.

In a further embodiment, the penetrant of the formulation of the present invention has an inherent color and the color from the carrier is instrumental in the color change. In still a further embodiment, the formulation comprises another component, not a colorant, that has an inherent color and the color from this component is instrumental in the color change. In another further embodiment, a color changing paint and varnish removal product is provided and the product comprises at least one penetrant and at least one carrier, and the color of the product derived from the color of the penetrant changes when the stripping action of the product has substantially ceased and the paint or varnish is ready for removal. In another embodiment, the penetrant is the colorant.

In still a further embodiment, the carrier of the present invention and the composition's viscosity may add additional benefits and results including but not limited to safe short-term human skin contact with the product or composition. In yet a further embodiment, the carrier may also function to mask the odor of other ingredients in the formulation thereby allowing for an odor free or odorless composition. In still yet a further embodiment, the present invention provides for better sag resistance and an effective way to prevent the excessive bubbling, blistering and swelling associated with problems relating to modern day paints, in particular, latex paints.

DETAILED DESCRIPTION OF THE INVENTION

As required, detailed embodiments of the present invention are disclosed herein; however, it is to be understood that the disclosed embodiments are merely exemplary of the invention that may be embodied in various forms. Therefore, specific functional details disclosed herein are not to be interpreted as limiting, but merely as a basis for the claims and as a representative basis for teaching one skilled in the art to employ the present invention in various ways.

The specific examples below will enable the invention to be better understood. However, they are given merely by way of guidance and do not imply any limitation.

EXAMPLE 1

One embodiment of the paint and varnish remover of the present invention marketed under the trademark "READY STRIPS® PLUS" was tested to determine if it would indicate a color change when the remover was finished working and was ready for the stripping step. In addition, the stripping steps were conducted at different time intervals to evaluate further the number of layers of paint removed at such time intervals. The time intervals included times prior to color change, at color change and after color change.

Test Sample:

A pine plank measuring 9 3/16 inches wide by 72 3/16 inches long by 0.748 (3/4) inch thick painted with twelve (12) coats of paint of varying colors was the test sample. Each paint coat was visible from one end of the plank by successive receding starting points of four (4) inch spacing for each paint coat. Prior to applying the first paint coat, the pine plank had been sealed with a varnish sanding sealer and sanded with sandpaper.

Paint Materials:

The paints used were as follows in the identified sequence of application: 1.) Black latex flat enamel; 2.) White hi-gloss, interior/exterior alkyd spray enamel; 3.) Wildflower Blue latex satin enamel; 4.) Claret Wine latex satin enamel; 5.) Taupe latex satin enamel; 6.) Hunter Green interior/exterior alkyd spray enamel; 7.) Cinnamon latex satin enamel; 8.) White hi-gloss latex enamel; 9.) Banner Red hi-gloss, interior/exterior alkyd spray enamel; 10.) Black latex flat enamel; 11.) Yellow hi-gloss, interior/exterior alkyd spray enamel; and 12.) Wildflower Blue latex satin enamel.

Instruments:

The average film thickness per paint coat was ascertained by measuring the pine plank with a vernier micrometer following the sanding step and following the dried twelve (12) coats of paint. The paint scrapers used were a triangular drag scraper with a stainless steel blade measuring 6.2 cm (2.44 inches) per edge and a "five-in-one" flat blade paint scraper with a stainless steel blade measuring 5.8 cm (2.283 inches). The applicators for applying the paint strippers were two-inch wide paint brushes.

Paint Application Procedure:

The pine board (plank) was first coated with a varnish sanding sealer and allowed to dry overnight [about sixteen (16) hours]. The board was sanded with 220 grain sandpaper to provide a smooth sealed wood surface. The paint coatings were applied with successive receding starting points at four (4) inch spacings so that each paint coat remained visible and traceable. The order of the paint coat deposition was black, white, blue, claret wine, taupe, hunter green, cinnamon, white, banner red, black, yellow, and blue. After the application of each paint coat, the paint was allowed to dry for four (4) hours. The first two (2) hours of drying was at ambient temperature which varied from 81° F. to 92° F. during the ambient drying step for the twelve (12) paint coats. The last two (2) hours, the drying was carried out under a hot air stream that varied in temperature between 105° F. to 122° F. After the third, the sixth, and the ninth paint coats, the entire drying was at ambient temperature overnight (14-16 hours). The overnight temperatures varied between 78° F. to 90° F. Following the final paint coat, the painted plank was left to cure for one hundred seventeen (117) hours under conditions of controlled temperature and humidity. The controlled curing environment was a temperature of 70° F. and humidity of 40-45%.

The dry film thickness of the twelve coats (12) of paint measured, with the vernier micrometer, 0.5 mm or 19.685 mil. The average dry paint coat thickness calculates to be 1.64 mil.

Ready Strip Application Procedure:

The READY STRIP® PLUS was applied to the top paint coat (blue) covering the eleven (11) paint coats beneath it. Both paint strippers were applied to cover a rectangular section of the painted plank that measured approximately 9½ inches by 3¼ inches with a thickness sufficient to mask the top paint color (blue). As initially applied, the READY STRIP PLUS had a medium green color. The Plus paint stripper turned color as the active ingredients penetrated the twelve (12) paint coats. The READY STRIP® PLUS changed color from medium green to a pale green after twenty-four (24) hours.

The test results of Example 1 is set forth in Table 1 below:

TABLE 1

| Stripper | Time | Elapsed Time, Hours | Paint Coats Removed |
|---|---|---|---|
| READY STRIP ® PLUS | 5$^{15}$pm (Aug. 9, 2005) | 4 | 4 |
| READY STRIP ® PLUS | 9$^{15}$pm (Aug. 9, 2005) | 8 | 7 |
| READY STRIP ® PLUS | 1$^{15}$pm (Aug. 10, 2005) | 24 | 12 |
| READY STRIP ® PLUS | 1$^{15}$pm (Aug. 12, 2005) | 72 | 12$^b$ |

$^b$The READY STRIP ® PLUS had dried to a hard layer. Water was layered over the dried paint stripper and allowed to soak into the stripper for about ten (10) minutes. The hydrated paint stripper was able to be penetrated with the drag scraper and twelve paint coats came off easily.

The stripping action was tested prior to full color change (partial color change) at the 4$^{th}$ and 8$^{th}$ hour of testing and only four (4) and seven (7) layers of paint, respectively were removed. The full color change (medium green to pale green) occurred at the 24$^{th}$ hour and all twelve (12) layers of paint were removed. In addition, the 72$^{nd}$ hour was also tested and the color remained changed, and all twelve (12) layers were removed.

EXAMPLE 2

Another embodiment of the paint and varnish remover of the present invention marketed under the trademark "READY STRIP® PRO" was tested to determine if it would indicate a color change when the remover was finished working and was ready for the stripping step. Again, the stripping steps were conducted at different time intervals to further evaluate the number of layers of paint removed at such time intervals. The time intervals included times prior to color change, at color change and after color change.

Test Sample:

A pine plank measuring 9³⁄₁₆ inches wide by 72³⁄₁₆ inches long by 0.748 (¾) inch thick painted with twelve (12) coats of paint of varying colors was the test sample. Each paint coat was visible from one end of the plank by successive receding starting points of four (4) inch spacing for each paint coat. Prior to applying the first paint coat, the pine plank had been sealed with a varnish sanding sealer and sanded with sandpaper.

Paint Materials:

The paints used were as follows in the identified sequence of application: 1.) Black latex flat enamel; 2.) White hi-gloss, interior/exterior alkyd spray enamel; 3.) Wildflower Blue latex satin enamel; 4.) Claret Wine latex satin enamel; 5.) Taupe latex satin enamel; 6.) Hunter Green interior/exterior alkyd spray enamel; 7.) Cinnamon latex satin enamel; 8.) White hi-gloss latex enamel; 9.) Banner Red hi-gloss, interior/exterior alkyd spray enamel; 10.) Black latex flat enamel; 11.) Yellow hi-gloss, interior/exterior alkyd spray enamel; and 12.) Wildflower Blue latex satin enamel.

Instruments:

The average film thickness per paint coat was ascertained by measuring the pine plank with a vernier micrometer following the sanding step and following the dried twelve (12) coats of paint. The paint scrapers used were a triangular drag scraper with a stainless steel blade measuring 6.2 cm (2.44 inches) per edge and a "five-in-one" flat blade paint scraper with a stainless steel blade measuring 5.8 cm (2.283 inches). The applicators for applying the paint strippers were two-inch wide paint brushes.

Paint Application Procedure:

The pine board (plank) was first coated with a varnish sanding sealer and allowed to dry overnight [about sixteen (16) hours]. The board was sanded with 220 grain sandpaper to provide a smooth sealed wood surface. The paint coatings were applied with successive receding starting points at four (4) inch spacings so that each paint coat remained visible and traceable. The order of the paint coat deposition was black, white, blue, claret wine, taupe, hunter green, cinnamon, white, banner red, black, yellow, and blue. After the application of each paint coat, the paint was allowed to dry for four (4) hours. The first two (2) hours of drying was at ambient temperature which varied from 81° F. to 92° F. during the ambient drying step for the twelve (12) paint coats. The last two (2) hours, the drying was carried out under a hot air stream that varied in temperature between 105° F. to 122° F. After the third, the sixth, and the ninth paint coats, the entire drying was at ambient temperature overnight (14-16 hours). The overnight temperatures varied between 78° F. to 90° F. Following the final paint coat, the painted plank was left to cure for one hundred seventeen (117) hours under conditions of controlled temperature and humidity. The controlled curing environment was a temperature of 70° F. and humidity of 40-45%.

The dry film thickness of the twelve coats (12) of paint measured, with the vernier micrometer, 0.5 mm or 19.685 mil. The average dry paint coat thickness calculates to be 1.64 mil.

Ready Strip Application Procedure:

The READY STRIP® PRO was applied to the top paint coat (blue) covering the eleven (11) paint coats beneath it. The Pro paint stripper was applied to cover a rectangular section of the painted plank that measured approximately 9½ inches by 3¼ inches with a thickness sufficient to mask the top paint color (blue). As initially applied, the READY STRIP® PRO had a medium brown color. The Pro paint strippers turned color as the active ingredients penetrated the twelve (12) paint coats. The READY STRIP® PRO substantially turned color from a medium brown to a very light tan at the eight (8) hour mark and fully turned color from medium brown to off-white after twenty-four (24) hours.

The test results of Example 2 is set forth in Table 2 below:

TABLE 2

| Stripper | Time | Elapsed Time, Hours | Paint Coats Removed |
|---|---|---|---|
| READY STRIP ® PRO | 5$^{15}$pm (Aug. 9, 2005) | 4 | 4 |
| READY STRIP ® PRO | 9$^{15}$pm (Aug. 9, 2005) | 8 | 12 |
| READY STRIP ® PRO | 1$^{15}$pm (Aug. 10, 2005) | 24 | 12 |
| READY STRIP ® PRO | 1$^{15}$pm (Aug. 12, 2005) | 72 | 12$^a$ |

$^a$The READY STRIP ® PRO had crusted over but was sufficiently pliable so that the drag scraper was able to cut through the crust and remove the twelve (12) paint coats.

The stripping action was tested prior to full color change (partial color change) at the 4$^{th}$ hour of testing and four (4) layers of paint were removed. A substantial color change (brown to light tan) occurred at the 8$^{th}$ hour of testing and all twelve (12) layers of paint were removed. The full color change (brown to off-white) occurred at the 24$^{th}$ hour and all twelve (12) layers of paint were removed. In addition, the 72$^{nd}$ hour was also tested and the color remained changed, and all twelve (12) layers were removed.

Therefore, while the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for manufacturing a paint removal formulation having a color change feature, said method comprising: combining at least one penetrant, at least one water insoluble carrier and at least one color visible colorant to form a formulation, said penetrant is selected from a group consisting of NMP, benzyl alcohol, ethyl lactate, diethyl adipate, diethyl glutarate, ethyl benzoate, dimethyl succinate, diethyl succinate, dimethyl phthalate, diethyl phthalate, dimethyl terphthalate, diethyl terphthalate, ethylene bis(lactate), dimethyl sulfoxide, soy solvents, D-limonene, methylene chloride, toluene, methyl ethyl ketone, acetone, methanol, xylenes, mineral spirits, hi-flash naphtha and mixtures thereof, and said water insoluble carrier is selected from a group consisting of polysaccharides, starch, cellulose, polydextran, chitosan, chitin, limestone, metal oxides, aluminum silicates, hydrated aluminates, sodium magnesium silicates, barium sulphates, ferroxides, magnesium aluminum silicates and mixtures thereof, wherein said carrier is in a sufficient quantity to perform said color change feature, and whereby said formulation is designed to be applied to a target area and as the surface of said formulation dries, said colorant migrates away from a surface of said formulation thereby creating a color change to indicate that said formulation with the stripped paint is ready for removal.

2. The formulation of claim 1 wherein said carrier partially dehydrates reflecting white light as the surface of said formulation dries.

3. The formulation of claim 1 further comprises water.

4. The formulation of claim 3 wherein said formulation comprises from about 5 to about 55% by weight of said penetrant, from about 2 to about 50% by weight of said carrier, from about 0.01 to about 1.0% by weight of said colorant and from about 15 to about 50% by weight of said water.

5. The formulation of claim 1 further comprises at least one thickening agent, said thickening agent being selected from a group consisting of Fullers earth, clay, attapulgite, montmorillonite, magnasol, klucel H, hydroxyethyl cellulose, hydroxypropyl cellulose, methocel and mixtures thereof.

6. The formulation of claim 1 further comprises at least one wetting agent, said wetting agent being selected from a group consisting of propylene glycol, butylene glycol, ethylene glycol, diethylene glycol, triethylene glycol, tetraethylene glycol, pentamethylene glycol, diethylene glycol monomethyl ether, monomethyl ethers of triethylene glycol, tetraethylene glycol, pentaerythritol, dipentaerythritol, neopentyl glycol and mixtures thereof.

7. The formulation of claim 1 further comprises at least one activator, said activator being selected from a group consisting of formic acid, acetic acid, glycolic acid, hydroxyacetic acid, chloroacetic acid, fluoroacetic acid, oxalic acid, lactic acid and mixtures thereof.

8. A method of manufacturing a colored paint removal product with a color changing feature, said method comprising: combining at least one penetrant, at least one water insoluble carrier, and at least one color visible colorant to form a product, said penetrant is selected from a group consisting of NMP, benzyl alcohol, ethyl lactate, diethyl adipate, diethyl glutarate, ethyl benzoate, dimethyl succinate, diethyl succinate, dimethyl phthalate, diethyl phthalate, dimethyl terphthalate, diethyl terphthalate, ethylene bis(lactate), dimethyl sulfoxide, soy solvents, D-limonene, methylene chloride, toluene, methyl ethyl ketone, acetone, methanol, xylenes, mineral spirits, hi-flash naphtha and mixtures thereof, said carrier is selected from a group consisting of polysaccharides, starch, cellulose, polydextran, chitosan, chitin, limestone, metal oxides, aluminum silicates, hydrated aluminates, sodium magnesium silicates, barium sulphates, ferroxides, magnesium aluminum silicates and mixtures thereof, wherein said carrier is in a sufficient quantity to perform said color change feature, and whereby the product is designed to be applied to the target area and as the surface of product dries, said colorant migrates away from the dehydrating surface and said carrier partially dehydrates reflecting white light thereby causing the product to become paler than its original color to indicate that said product with the stripped paint is ready for the removal step.

9. The product of claim 8 further comprises water.

10. The product of claim 9 wherein said formulation comprises from about 5 to about 55% by weight of said penetrant, from about 2 to about 50% by weight of said carrier, from about 0.01 to about 1.0% by weight of said colorant and from about 15 to about 50% by weight of said water.

11. The product of claim 8 further comprises at least one thickening agent, said thickening agent being selected from a group consisting of Fullers earth, clay, attapulgite, montmorillonite, magnasol, klucel H, hydroxyethyl cellulose, hydroxypropyl cellulose, methocel and mixtures thereof.

12. The product of claim 8 further comprises at least one wetting agent, said wetting agent being selected from a group consisting of propylene glycol, butylene glycol, ethylene glycol, diethylene glycol, triethylene glycol, tetraethylene glycol, pentamethylene glycol, diethylene glycol monomethyl ether, monomethyl ethers of triethylene glycol, tetraethylene glycol, pentaerythritol, dipentaerythritol, neopentyl glycol and mixtures thereof.

13. The product of claim 8 further comprises at least one activator, said activator being selected from a group consisting of formic acid, acetic acid, glycolic acid, hydroxyacetic acid, chloroacetic acid, fluoroacetic acid, oxalic acid, lactic acid and mixtures thereof.

14. A method of manufacturing a paint removal composition with a color changing feature, said method comprising admixing at least one penetrant, at least one water insoluble carrier, and at least one color visible colorant, said penetrant is selected from a group consisting of NMP, benzyl alcohol, ethyl lactate, diethyl adipate, diethyl glutarate, ethyl benzoate, dimethyl succinate, diethyl succinate, dimethyl phthalate, diethyl phthalate, dimethyl terphthalate, diethyl terphthalate, ethylene bis(lactate), dimethyl sulfoxide, soy solvents, D-limonene, methylene chloride, toluene, methyl ethyl ketone, acetone, methanol, xylenes, mineral spirits, hi-flash naphtha and mixtures thereof, and said carrier is selected from a group consisting of polysaccharides, starch, cellulose, polydextran, chitosan, chitin, limestone, metal oxides, aluminum silicates, hydrated aluminates, sodium magnesium silicates, barium sulphates, ferroxides, magnesium aluminum silicates and mixtures thereof, wherein said carrier is in a sufficient amount to perform said color change feature, and whereby said composition is designed to be applied to a target area and said composition changes color when said composition with the stripped paint is ready for scraping and removal.

15. The method of claim 14 wherein said colorant migrates away from a surface of said formulation as the surface of said formulation dries.

16. The method of claim 15 wherein said carrier partially dehydrates emitting white light as the surface of said formulation dries.

17. The method of claim 14 further comprises admixing water.

18. The method of claim 17 wherein said formulation comprises from about 5 to about 50% by weight of said penetrant, from about 2 to about 50% by weight of said carrier, from about 0.01 to about 1.0% by weight of said colorant and from about 15 to about 50% by weight of said water.

19. The method of claim 14 further comprises admixing at least one thickening agent, said thickening agent being selected from a group consisting of Fullers earth, clay, attapulgite, montmorillonite, magnasol, klucel H, hydroxyethyl cellulose, hydroxypropyl cellulose, methocel and mixtures thereof.

20. The method of claim 14 further comprises admixing at least one wetting agent, said wetting agent being selected from a group consisting of propylene glycol, butylene glycol, ethylene glycol, diethylene glycol, triethylene glycol, tetraethylene glycol, pentamethylene glycol, diethylene glycol monomethyl ether, monomethyl ethers of triethylene glycol, tetraethylene glycol, pentaerythritol, dipentaerythritol, neopentyl glycol and mixtures thereof and admixing at least one activator, said activator being selected from a group consisting of formic acid, acetic acid, glycolic acid, hydroxyacetic acid, chloroacetic acid, fluoroacetic acid, oxalic acid, lactic acid and mixtures thereof.

21. A process for preparing a paint removal product having a color change feature to indicate when the product is ready for removal, said method comprising: combining at least one penetrant, at least one water insoluble carrier and at least one color visible colorant to form a product, said penetrant is selected from a group consisting of NMP, benzyl alcohol, ethyl lactate, diethyl adipate, diethyl glutarate, ethyl benzoate, dimethyl succinate, diethyl succinate, dimethyl phthalate, diethyl phthalate, dimethyl terphthalate, diethyl terphthalate, ethylene bis(lactate), dimethyl sulfoxide, soy solvents, D-limonene, methylene chloride, toluene, methyl ethyl ketone, acetone, methanol, xylenes, mineral spirits, hi-flash naphtha and mixtures thereof, and said water insoluble carrier is selected from a group consisting of polysaccharides, starch, cellulose, polydextran, chitosan, chitin, limestone, metal oxides, aluminum silicates, hydrated aluminates, sodium magnesium silicates, barium sulphates, ferroxides, magnesium aluminum silicates and mixtures thereof, wherein said carrier is in a sufficient quantity to perform said color change feature, and whereby said product is designed to be applied to a target area and said product changes color when said product with the stripped paint is ready for removal.

* * * * *